United States Patent [19]
Greene

[11] Patent Number: 4,561,017
[45] Date of Patent: Dec. 24, 1985

[54] GRAPHIC INPUT APPARATUS

[76] Inventor: Richard Greene, 700 31st Ave. #2, San Francisco, Calif. 94123

[21] Appl. No.: 524,534

[22] Filed: Aug. 19, 1983

[51] Int. Cl.⁴ ............................................. H06N 7/18
[52] U.S. Cl. ...................................... 358/93; 358/226
[58] Field of Search ................ 358/93, 217, 215, 226, 358/242, 250, 81

[56] References Cited

U.S. PATENT DOCUMENTS 3,846,826  11/1974  Mueller ................................. 358/81

*Primary Examiner*—Howard W. Britton
*Attorney, Agent, or Firm*—Limbach, Limbach & Sutton

[57] ABSTRACT

A computer graphic input device is disclosed for imaging the points of contact between objects and a surface. The input device is defined by a transparent material with one surface thereof defining a drawing surface. The index of refraction of the material is greater than the index of refraction of the medium on the upper side of the drawing surface. In the preferred embodiment, the transparent material is prism shaped in configuration. A camera is mounted on the lower side of the drawing surface in a manner to only capture light rays which have been totally internally reflected from the drawing surface. By this arrangement, objects located on the upper side of the drawing surface will be imaged by the camera only when and where the object is in direct contact with the drawing surface. The size and shape of the input pattern is digitized, processed and displayed on a monitor. The subject apparatus can be used to produce graphic effects achieved by various natural drawing implements, such as a brush.

12 Claims, 6 Drawing Figures

GRAPHIC INPUT APPARATUS

BACKGROUND ART

In computer graphics systems and the like, input devices such as light pens and digitizing tablets allow users to place the coordinates of the position of a hand-held stylus into the display memory of a computer. Thus, users can define successive locations in order to draw lines or bands of color on a video display. However, since these devices only digitize the location of a single point or a few points within the time of a single video frame, other features of the line, such as its texture and width, cannot be made dependent on hand orientation and pressure in the way that lines painted with a brush or other adjustable graphic arts tool or with the fingers themselves are. Therefore, users accustomed to drawing complex and orderly patterns by the rapid placement of individually structured strokes of such tools cannot achieve those effects with currently available computer graphic input devices.

DISCLOSURE OF THE INVENTION

The invention provides a computer graphic input device which digitizes the image of a brush or any other object held and positioned by hand against a drawing surface. More specifically, a graphical input device is disclosed which includes a transparent material where one surface thereof defines a drawing surface. The index of refraction of the material is greater than the index of refraction of the medium on one side of the drawing surface. In accordance with the subject invention, a camera is mounted on the other side of the drawing surface in a manner to capture light rays which have been totally internally reflected from the drawing surface. By this arrangement, an object located on the upper side of the drawing surface will be imaged by the camera only when the object is in direct contact with the drawing surface.

In the preferred embodiment, the drawing surface is defined by one face of a large transparent triangular prism. The camera views this surface through a second face of the prism, at an angle which everywhere exceeds the critical angle, so that when nothing is held against the drawing surface, the only light which the camera receives is that which has reached it by total internal reflection from that surface. Thus, only those portions of an object which are in direct contact with the drawing surface (or in direct contact with a layer of clear liquid which itself makes direct contact with that surface thereby defining an effective drawing surface) can be seen by the camera. The size and shape of the input pattern which is digitized within a single video frame may therefore be continuously adjusted by controlling how much of the object contacts the surface at any time.

When, for example, a pointed brush is held so that only its tip touches the drawing surface, a narrow solid line can be drawn. When it is held closer to the surface, the width of the line increases. When the brush is held so close to the surface that its individual fibers spread apart, a set of fine parallel lines will be drawn. The device can therefore also produce the graphic effects achieved by twisting or changing the angle of such a brush.

A cloth, sponge, or piece of paper may be used to fill large areas with textured patterns. The fingers and hand may be held directly against the drawing surface to achieve finger painting effects. Also, a rigid stylus may be used to draw fine lines of constant width, so that the invention may be used in the same way as a conventional light pen or digitizing tablet.

By changing the area of the drawing surface imaged by the camera, the apparent size of the brush or other drawing implement may be varied, although this will also change the apparent magnification of the hand movements which produce the drawing.

BRIEF DESCRIPTION OF THE DRAWINGS

The preferred embodiment of the invention will be further described in connection with the accompanying drawings, in which.

DETAILED DESCRIPTION OF THE PREFERRED EMBODIMENT

Figure 1:
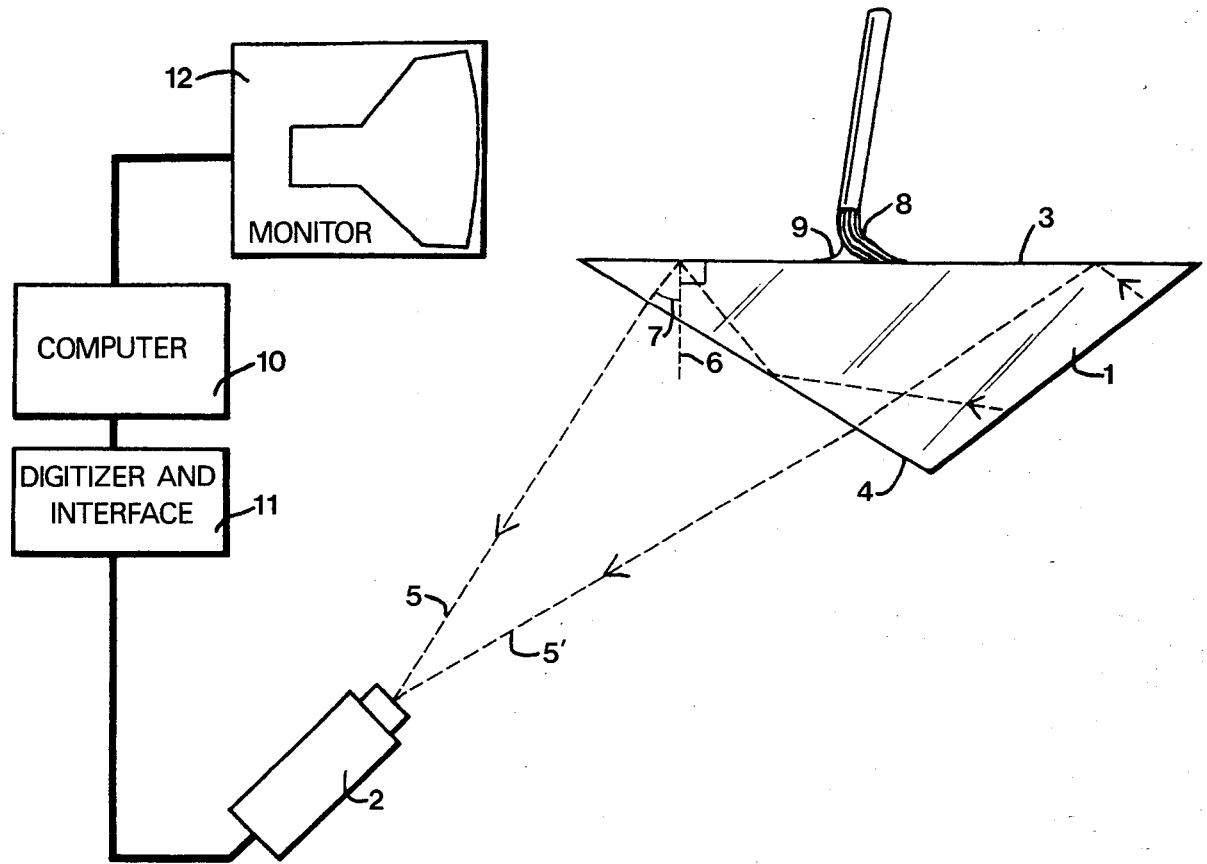
FIG. 1 is a schematic showing of a system which includes the preferred computer graphic input device.

The preferred construction of the device is shown schematically in FIG. 1. It uses a large prism 1 composed of a transparent material with index of refraction significantly greater than that of the surrounding air. This material may be either solid glass or plastic or a hollow shell of glass or plastic filled with a transparent liquid, such as water or oil, or a gas with an index of refraction greater than that of air. A video camera 2 is positioned so that its field of view is entirely occupied by the drawing surface 3 (which is the largest face of the prism and is viewed through another face 4) and so that the rays of light 5 which reach the camera from the closest visible point of the drawing surface intersect the surface normal 6 at that point in an angle 7 which is just greater than the critical angle for the material of the prism in air. This guarantees that all of the other rays of light reaching the camera from the drawing surface, including those rays 5' which come from its most distant visible points, will also intersect the surface normals in angles greater than the critical angle. Thus, when nothing but air is in contact with the drawing surface, the only light which can reach the camera is that which has been totally internally reflected within the prism from that surface. In some prism configurations, light rays reaching the camera from the drawing surface may also have been reflected from face 4, prior to reaching the drawing surface, as illustrated by ray 5. In accordance with the subject invention, if an object 8 is brought into direct contact with the drawing surface, or into direct contact with a small amount of oil or water 9 or other fluid with an index of refraction greater than that of air which itself makes direct contact with the surface, then the layer of air necessary for total internal reflection will be eliminated at the points of contact, and so the camera will be able to view those points of the object.

The video camera converts the image of those portions of an object which are contacting the drawing surface into a time-varying analog electrical signal, which is synchronized with a timing signal sent from the computer 10 via the digitizer and interface 11. The digitizer and interface convert the analog video signal into a digital one and place it in the format appropriate to the computer being used. The computer can store this data within its memory in a way which preserves the order of the original video signal and can retrieve that data and send it to a video display monitor 12 in that same order and with the same timing relative to the synchronization signal. The monitor would then display a digitized image of those portions of the object contacting the drawing surface.

Figure 5A:
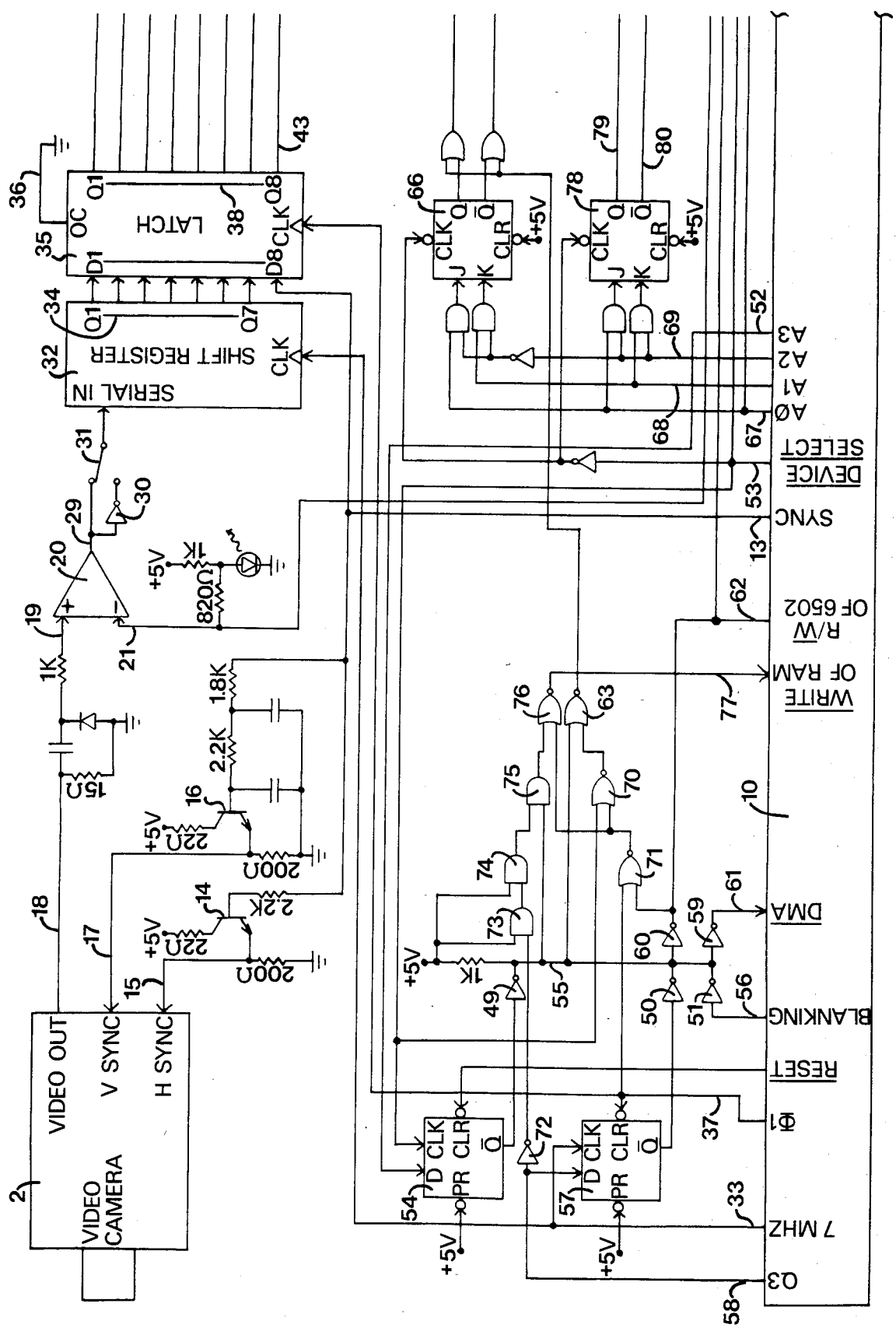
FIGS. 5a and 5b are composite schematic diagrams showing an electronic circuit for digitizing, processing and displaying images in accordance with the subject invention.
Figure 5B:
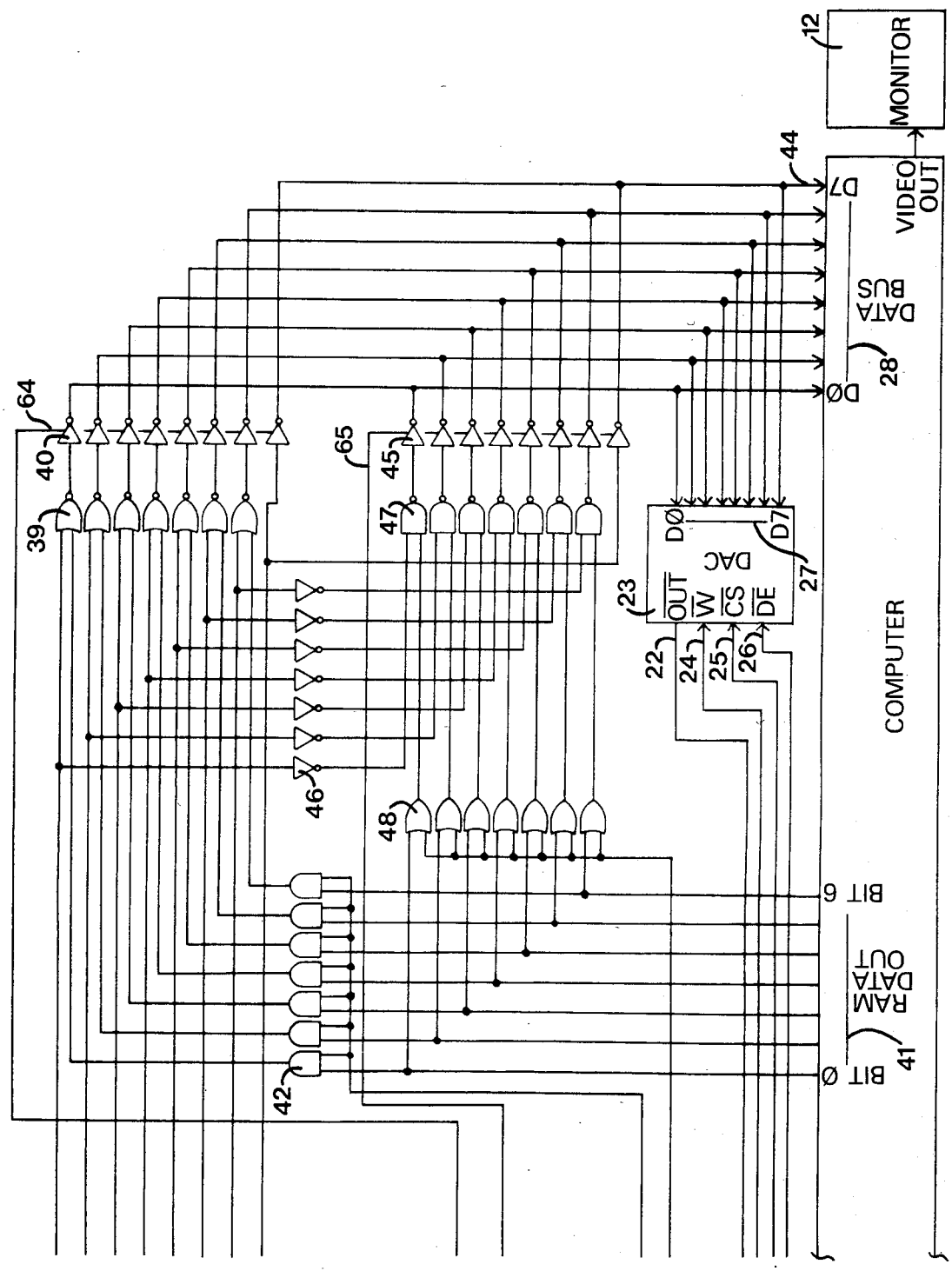

The computer and interface can also process the data stored in memory and the incoming video data in various ways to produce different outputs. For example, the circuit shown in FIGS. 5a and 5b allows one to digitize and process the output of a black and white video camera 2 so that users can produce drawings in the high-resolution graphic display of the Apple II or Apple II Plus microcomputer 10 by moving objects within the camera's field of view.

The disclosed circuit is an improvement on the Dithertizer II, a video digitizer manufactured by Computer Stations Inc. The Dithertizer uses a single negative logic transition to both enable its output to the computer's data bus and to signal RAM to store that data. Since this transition occurs before the negative transition of the computer's column address strobe ($\overline{CAS}$), the memory circuits are forced to execute an "early write" cycle. In such a cycle, stored data does not become available at the data out pins, which instead float in a high impedance state. Since the computer's RAM data latches still try to read stored data at that time, in order to send it to the video monitor for display, and since the floating state of the RAM output pins is interpreted as a high logic level, the monitor displays a screen consisting of points all turned on whenever a new video frame is digitized. Thus, although only 1/60 of a second is required to digitize a complete video frame, that process cannot be repeated 60 times per second if users wish to simultaneously view the digitized data on the display. The maximum repetition rate is limited by the degree of acceptable image contrast degradation due to the flashing on of the entire screen during each new digitized frame.

However, by modifying the circuit so that the negative transition of the $\overline{WRITE}$ signal to RAM does not occur until after the minimum $\overline{CAS}$ to $\overline{WRITE}$ delay necessary for a "read/modify/write" cycle, the memory circuits are forced to execute such a cycle instead of the early write cycle. In a read/modify/write cycle, valid stored data does indeed become available on the RAM data out pins, so that old data can be read at the same time that new data is being written. This allows users to digitize and simultaneously display video input at repetition rates up to 60 frames/sec. As long as the negative transition of the $\overline{WRITE}$ signal occurs before the minimum write command to $\overline{RAS}$ (row address strobe) lead time, it may also be delayed long enough to allow the old and new data to be processed before being written to the same location within the same machine cycle, thus allowing for real time (60 frames/sec) video image processing.

The computer's composite sync signal 13 drives a transistor 14, such as 2N3904, which drives the horizontal sync 15 of the video camera's timing circuits. The vertical component of the composite sync is filtered out and used to drive an identical transistor 16, which drives the camera's vertical sync 17.

The camera's video output 18 is filtered and sent to the non-inverting input 19 of a comparator 20, such as a CMP-01. The inverting input 21 of the comparator is held at a threshold voltage level which is set by the output 22 of a digital to analog converter 23, such as an AM6080. Whenever this DAC's write 24, chip select 25, and data latch enable 26 lines are pulled low, it takes input 27 from the data bus 28, so that users can adjust the threshold to which the video signal is compared. Thus the output 29 of the comparator is a binary digital signal in which a high logic level represents a point imaged by the camera which is brighter than the threshold and a low logic level represents a darker point. The polarity of this signal may be reversed by switching an inverter 30 into its path with either a mechanical switch 31 or a flip-flop. The digital video signal then goes to an 8-bit serial in/parallel out shift register 32, such as a 74LS164, which is clocked by the 7 MHz clock signal 33 of the computer. The first seven bits of its output 34, along with the computer's sync signal, are latched by an 8-bit latch 35, such as a 74LS374 with its output control 36 held in the enabled state. This register is clocked by the rising edge of the computer's phase 1 system clock ($\phi 1$) signal 37, so that its output 38 consists of an eight bit word with the current state of the sync signal as the most significant bit, and seven bits of new video data, every machine cycle.

By having the microprocessor repeatedly test the most significant bit of that word, a machine language program can detect the vertical sync pulse which indicates the start of a new frame within the computer's video generation circuitry. At that time, assuming that the computer is in a high-resolution graphics mode, its RAM address multiplexer begins generating the addresses, in screen order, of each of the locations within one of its picture buffers, at a rate of one location every machine cycle, so that they may be read from and their seven bits of displayable data be sent to the monitor 12. Since the camera's raster scan is synchronized with that of the monitor and the multiplexer, if the seven bits of video data held in the latch are written to each of the memory locations addressed in turn by the multiplexer, during the time when a single video frame would normally be read only, the picture buffer will then contain a new digitized image, appropriately scrambled and ready for display in the next frame. That is the procedure which is used in the disclosed circuit to obtain a digitized image, although provision has also been made to compare this input to data previously stored at that location, before writing the results back to the same location, to allow for drawing.

In order to achieve frame rates high enough to allow for the drawing of continuous strokes with objects moving at comfortably high velocities, the processing of each word of video data must occur within the single machine cycle per frame during which the location of that word is addressed by the multiplexer. In fact, since old data from RAM must be used in this process, the allowable processing time is limited by the approximately 50 nsec which elapse between the availability of valid data on the output pins of the computer's 4116-3 RAM's and the latest time by which modified data must be stable and ready to be written in such a read/modify/write cycle. In order to minimize the total propagation delay time of the logic which does the processing, inverting gates were used in combination with inverting output buffers, and the separate logic functions associated with drawing in black and in white were implemented with separate data paths, either of whose output may be selected, rather than a single path with more gates, and hence, more propagation delay.

Assuming that the switch 31 is set to select the non-inverted output of the comparator, so that object points brighter than the threshold will be represented by a high logic level, and also assuming that the user wants to draw in white on a dark background (two assumptions which are completely independent) then the desired function is simply to store in memory a logical high for an imaged point if it is above threshold currently or if stored data indicates that it was above threshold at some earlier time during the drawing process, so that those brighter points will leave traces behind as they are moved. This function is accomplished by seven NOR gates 39, such as 74LS02's, along with an 8-bit inverting three-state buffer 40, such as a 74S240. Each of those NOR gates takes one input from the output of the latch and its other input from the seven least significant bits of data output 41 of the 4116-3 RAM's (which are most conveniently available at the 74LS174's at locations B5 and B8 on the Apple main logic board). The output from RAM must first pass through a set of seven AND gates 42, such as 7408's, whose other inputs are held high to allow the drawing process to continue. When those inputs are pulled low, so are the inputs to the NOR gates which would otherwise contain old RAM data, thus allowing new digitized video data to emerge from the buffer unprocessed. The output of the buffer (whether consisting of processed or unprocessed data) is connected directly to the computer's data bus and thus to the data input pins of RAM, so that the data can be stored in memory when the appropriate write signal is given. The latch output line 43 which contains the sampled sync signal is fed directly to the buffer, and thence to the most significant line of the data bus 44.

If the user wants to draw in black on a white background, then the buffer 40 in the first path is disabled and instead another identical buffer 45 is enabled to allow the writing of data processed along a separate path. On this path, the new video data is first inverted by a set of seven inverters 46, such as 7404's, and is then AND'ed with old RAM data by a set of seven NAND gates 47, such as 7400's and the inverting buffer. On this path, the output from RAM must first pass through a set of seven OR gates 48 such as 74LS32's, whose other inputs are pulled low for use of the drawing function, or held high to allow inverted but otherwise unprocessed video data through to the data bus. Again, the sampled sync signal is fed directly to the second buffer and thence to data line D7. In this arrangement, a blank part of the screen is represented by a high logic level and drawing strobes are represented by a low logic level in memory.

The circuit uses the outputs of three open collector inverters 49, 50 and 51, interconnected in the wired AND configuration, to provide most of its timing and control signals. When the microprocessor detects a vertical sync pulse, it can begin writing a new video frame to memory by referencing a location which sends address line A3 52 high while sending a pulse on the device select line 53 to which the interface is connected. Assuming the digitizer and interface is connected to peripheral connector number 7 (not shown) in the Apple, which is the only one providing a sync signal, the desired location would be 49400. This will cause the $\overline{Q}$ output of a type-D flip-flop 54, such as a 74LS74 to go low, thereby allowing the output 55 of the wired AND to go high, as long as its other two inputs are also high. The first of these other inputs is the computer's composite horizontal and vertical blanking signal 56 (available at pin 6 of the 74LS32 at location C14 on the Apple's main logic board) after passing through the inverter 51. The remaining input comes from another identical type-D flip-flop 57 which uses the computer's 7 MHz, $\phi1$, and Q3 58 clocks to generate a timing signal which appears at the input of the inverter 50 as a pulse which goes low approximately 140 nsec into $\phi1$ and stays low for approximately 280 nsec. Thus, once the microprocessor has initiated the writing of a new frame, the output of the wired AND connection will consist of positive going pulses during $\phi1$ of every machine cycle which occurs during the displayed portion of each displayed horizontal line. These pulses pass through inverters 59, 60 and thence to the microprocessor's $\overline{DMA}$ 61 and $\overline{READ/WRITE}$ 62 pins, thereby allowing for writing to RAM with direct memory access at that time. The output of the wired AND also supplies the enable signal for the output buffers by having its pulses inverted by a NOR gate 63, such as a 74LS02, and then sending them to the output enable 64, 65 of one or the other buffer, depending on the setting of a J-K flip-flop 66, such as a 7473, whose inputs are connected to address lines A0 67, A1 68 and A2 69 and which is clocked by the device select signal. Again, assuming that the digitizer and interface is connected to peripheral connector number 7 in the Apple, users can select drawing in white by referencing location 49394, drawing in black by referencing 49393, or toggle between the two colors by referencing location 49395.

The other input to the NOR gate 63 comes from the output of another NOR gate 70 whose inputs (the device select line and the NOR 71 of $\phi1$ and the READ/WRITE signal) allow the output buffer to be enabled when the device select line goes low along with address line A3 (as happens when the interface is in peripheral connector number 7 and location 49392 is loaded), so that between frames, the microprocessor can examine the status of the sync signal, as sampled by the latch.

The output of the wired AND makes its transition too soon to serve as a write signal for the 4116-3 RAM's, if they are to execute a read/modify/write cycle. Therefore, the Q3 signal, after being inverted 72 and delayed by two AND gates 73, 74, such as 7408's, whose other inputs are held high, is combined with the output of the wired AND at another AND gate 75 and inverted by a NOR gate 76 to provide a sufficiently delayed $\overline{write}$ signal. This must be connected directly to the $\overline{WRITE}$ pins of the RAM's 77, while the output of the 74LS32 at Apple main board location C14, pin 11, which normally provides that write signal, must be disconnected from those pins. The NOR of $\phi1$ and the microprocessor's $\overline{READ/WRITE}$ line goes to the other input of the NOR gate 76 so that RAM will still receive its usual write signals as well, even when the interface is connected but not in use.

The microprocessor, after initiating the storage of a new video frame, may execute a program which simply waits for the approximately 15 msec it takes to display (and digitize) a single frame. The microprocessor can then reference an address which pulses the device select line while leaving address line A3 low (such as location 49392 for peripheral connector number 7) in order to send the Q output of the flip-flop 54 high, thereby stopping the writing of video data at the end of the frame. The whole process may then be repeated as soon as the microprocessor detects the next vertical sync pulse, so that frame rates of up to 60 frames per second may be achieved with the Apple II.

A J-K flip-flop 78, such as a 7473 is used to control whether processed or unprocessed new video data is written to memory. Assuming the digitizer and interface is in peripheral connector number 7, users may select the drawing function (processed data) by referencing location 49397, which will send Q 79 high and $\bar{Q}$ 80 low thereby causing the AND gates 42 and OR gates 48 to become transparent to the old data from RAM. Users can select the scanning function (unprocessed data) by referencing location 49398.

When an object is held in contact with the drawing surface, users may adjust the threshold of the comparator until only the regions of contact appear in the unprocessed digitized display, provided that there is sufficient contrast between the intensity of the object and that of the totally internally reflected background. If the switch 31 is set so that object points are represented as a high logic level and the user then selects the drawing function (in either color), a picture may then be built up by moving the object to successive positions on the drawing surface. If that object is a brush loaded with water or oil or other clear liquid, then by manually adjusting the height and angle of the brush relative to the drawing surface, either a point or a larger area or a set of small separate areas may be defined for the computer at any brush position. Since these patterns can be continuously transformed into each other by the relative movement of individual brush fibers at the same time that the brush as a whole is moving, the spatial frequencies of graphical input can be continuously varied during the process of drawing a single stroke.

In order to obtain different ranges of variation, the area viewed by the video camera may be changed by changing either its distance from the drawing surface or the focal length of its lens. In addition, a variety of objects may be used as drawing implements. These would include brushes with natural or synthetic fibers, fiber optics, light pipes, palette knives, flexible quills, blunt or pointed rigid or semi-rigid styli, sponges, textiles, and the fingers and hands. A crayon or grease pencil may be used to draw a pattern on the drawing surface which remains in the display until it is physically removed with a cloth, even when the display is electronically erased. A flat object or piece of paper or cloth which contains a drawn, printed, or dyed surface pattern may be wet and held against the drawing surface so that that pattern is itself imaged by the camera and digitized. Droplets of clear liquid which are placed on the drawing surface may refract the light from objects in the surrounding air in such a way that that light reaches the camera (because of the curvature of the surface of the droplets). Thus splatter effects may be achieved by shaking droplets onto the drawing surface, and if that surface is inclined, drip effects may be achieved by allowing large drops to flow down it. It may also be desirable to cover an entire drawing surface with a layer of clear liquid so that the drawing implements would not have to be wet separately, and so that no droplets would form on the drawing surface.

Since the video camera views the drawing surface at an angle such that its focal plane is not parallel to that surface, its image of that surface will not be geometrically similar to the surface itself but will be distorted by perspective. Thus if the drawing surface is a rectangle, its image in the camera's focal plane will be a trapezoid. This distortion may be corrected by adjusting the camera's raster generating circuits so that the area covered by the raster is also a trapezoid.

Three adjustments are necessary in order to fully correct for this distortion. More specifically, in the trapezoid image, the spacing between each successive horizontal line is compressed as it approaches the short end of the trapezoid. In order to correct for this compression, the normally linear ramp signal, which generates the vertical deflection and thus the spacing between lines, must be changed. Ideally, the ramp signal will be made parabolic such that the vertical spacing between successive horizontal scan lines, though covering unequal intervals within the camera, will correspond to equal intervals on the drawing surface itself. In order to ensure that the image of the drawing surface takes up the full field, the vertical size of the scan should also be decreased. Existing controls in the camera are typically provided to make these types of adjustments, however, modifications such as changing resistance or capacitance values may have to be made in order to permit full correction.

A third adjustment is necessary for correcting the angles of the sides of the scan, or the narrowing of the image adjacent the short side of the trapezoid. To achieve this result, the size of the horizontal deflection must be modulated in proportion to the degree of vertical deflection, so that it covers less horizontal distance at the narrow end of the trapezoid image than at the wide end. In many cameras the size or width of the horizontal scan is controlled by a coil with a movable ferromagnetic core. By placing this core in a magnetic field, the inductance of the coil may be decreased, thereby increasing the horizontal width of the scan. In operation, an electromagnet is used to vary the field around the core throughout the scan in proportion to the vertical deflection.

This variation can be made to occur in either of two ways depending on whether the camera is oriented such that the wide end or the narrow end of the trapezoid image is at the beginning of the vertical scan. If the scan starts at the wide end of the image, then a high magnetic field is initiated during the vertical blanking interval. The magnetic field is allowed to decay as the raster scan proceeds through a full cycle. By this arrangement, the inductance of the control coil will gradually increase such that the horizontal width of the scan will gradually decrease until the full image has been covered.

If the vertical scan starts at the narrow end of the image, then the magnetic field surrounding the core of the control coil must be gradually increased during the displayed portion of the vertical scan, and then quickly reduced to its initial level during the vertical blanking interval. Thus, the horizontal width of the scan will gradually increase until the full image has been covered. In both cases, a fixed inductance may be added in series with the horizontal width control coil in order to bias the average width of the scan and thereby obtain the desired aspect ratio.

In cameras which utilize an array of discrete photosensitive elements, such as charge-coupled devices, the distortion could be eliminated by making the array itself in the form of a trapezoid, with the appropriate spacing between its individual elements. These distortions could also be corrected optically by placing another prism or the appropriate aspheric lens in front of the camera's lens, or by mounting the camera's lens in its original position but rotating the body of the camera so that its light sensitive surface was parallel to the drawing surface. The distortion could also be corrected by numerical transformations performed by the computer or by adjusting the raster generating circuits of the video monitor in a way analogous to that described above for adjusting the camera. The distortions may also be left uncorrected in order to obtain an automatic perspective projection of graphic input.

Since the video camera views the drawing surface from the side opposite to the one the user views it from, it will also be necessary to reverse the camera's image of that surface to make it correspond to the user's. This may be done electronically by reversing the raster scanning direction in either the camera, interface, or monitor. It may also be achieved optically by viewing the monitor's image in a mirror or by having the camera view the image of the drawing surface reflected in a mirror. This latter approach also has the advantage of folding the optical path so that the camera may be located in a more convenient position. Ideally, the camera should view the drawing surface from as far away as possible so that the angle at which it views the drawing surface and the distance from which it must focus upon that surface is as uniform as possible. Also, the aperture of the camera should be made as small as possible to maximize the depth of field.

In order to obtain the maximum signal to noise ratio in the digitized image of a drawing implement on the drawing surface, the contrast in brightness between the implement and the internally reflected background must be maximized. This may be achieved in either of two complementary ways as shown in FIGS. 2 and 3.

Figure 2:
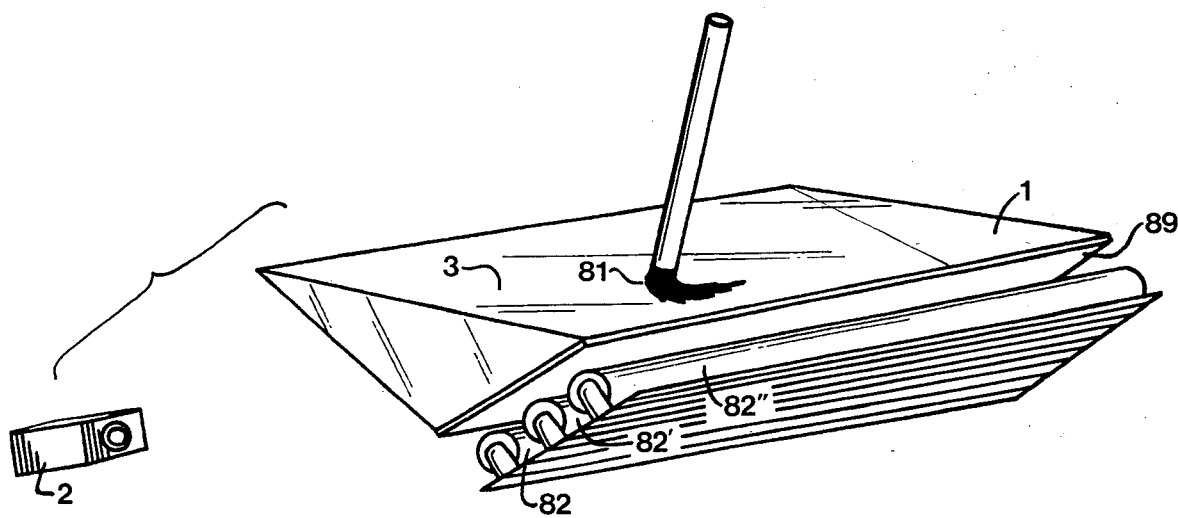
FIG. 2 is a perspective view of a preferred input device for use with dark drawing implements.

FIG. 2 shows the form of the device which would be used with black or darkly colored drawing implements 81. A translucent white diffusing screen 89 covers the side of the prism 1 which is viewed by the video camera 2 after a total internal reflection from the drawing surface 3. The diffusing screen is uniformly illuminated by sources of light 82, 82', 82" such as flourescent lights. This provides a uniform bright background against which any dark objects in contact with the drawing surface will stand out in high contrast, thereby providing a strong video output signal from the camera.

Figure 3:
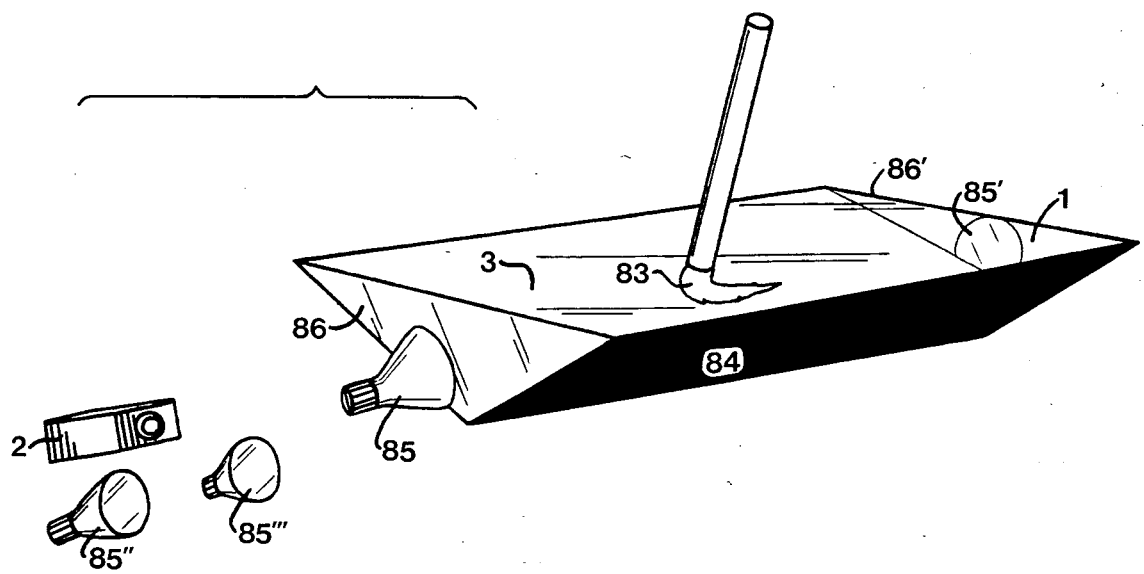
FIG. 3 is a perspective view of a preferred input device for use with lightly colored drawing implements.

FIG. 3 shows the form of the device which would be used with white or lightly colored drawing implements 83. An opaque black screen 84 covers the side of the prism 1 which is viewed by the video camera 2 after a total internal reflection from the drawing surface 3. Light sources 85, 85', 85", 85'" illuminate the drawing implement from below the drawing surface and from a multiplicity of directions by sending their light up through the transparent ends 86, 86' of the prism or through the face through which the camera views the drawing surface at angles such that none of their light is reflected to the camera by either of those surfaces. This provides a uniform black background against which any light objects in contact with the drawing surface will produce a strong video output signal. Since the camera views the more distant portions of the drawing surface at more oblique angles and therefore through a greater portion of the prism, it is desirable to concentrate a higher level of illumination in this area to provide even illumination to all objects in the field.

These two methods of maximizing contrast may be combined in one embodiment of the device, so that either light or dark drawing implements may be used with it at different times. This would require that both sets of light sources be available and that the white translucent screen be replaceable by a black opaque screen. An electronic inverter 30 which can be switched into the video output signal path enables the polarity of that signal to be the same regardless of whether a dark object on a light background or a light object on a dark background is being used for input.

Where maximum drawing speed is desired, the arrangement shown in FIG. 3 is preferred. More specifically, in the embodiment shown in FIG. 3, the blank field is dark, such that the phosphors in the camera 2 are in an unactivated state. When a white brush is placed on the surface of the prism, the phosphors are actuated. The rise time of actuated phosphors is much faster than their decay time, such that the image will be produced quickly. In contrast, in the arrangement shown in FIG. 2, the phosphors in the camera are fully actuated for a blank screen. Thus, when a dark brush is placed against the drawing surface the phosphors begin to decay. Since the decay time is slower than rise time, the image of the brush moving across the prism face will be less responsive than in the arrangement shown in FIG. 3.

Figure 4:
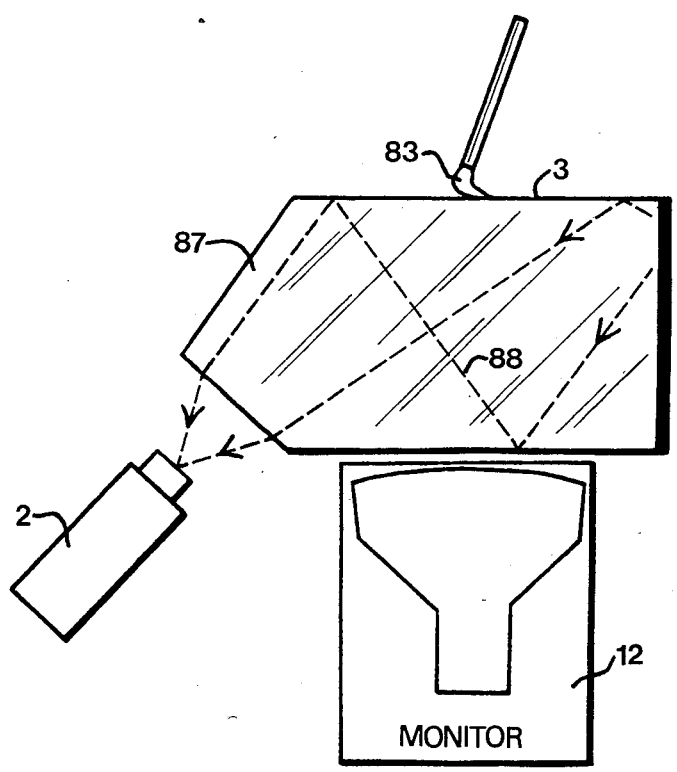
FIG. 4 is a schematic showing of a preferred input device which allows the video display to be viewed through the device.

Although the video camera must view the drawing surface through an optical interface which is not parallel to it (in order for light totally internally reflected from the drawing surface to reach the camera) it is not necessary that the prism be triangular in cross section. FIG. 4 shows a cross section of a prism 87 which could be used to enable the video monitor 12 to be viewed through the drawing surface 3 itself. Lenses could be interposed between the video monitor and the prism, or a parabolic mirror could be used below the monitor, in order to produce a real image of the monitor screen which was coincident with the drawing surface. Thus users could see the result of their input at the same point where they were providing that input, just as in painting or drawing on paper or canvas. Such a prism could also be used to achieve more uniform illumination of lightly colored drawing implements 83 than the embodiment shown in FIG. 3. Light sources could be placed below the prism (in the position occupied by the monitor in FIG. 4) and aimed directly up at the drawing surface. In all cases, contrast can be improved by placing light restricting baffles (not shown) around the camera 2 and the adjacent prism face in order to minimize spurious signals. It should be noted that FIG. 4 illustrates a light ray 88 which has been reflected off the lower surface of the prism prior to being reflected off the drawing surface.

A color video camera could be used with the disclosed graphic input device so that differently colored objects in contact with the drawing surface could simultaneously send different signals to the host computer. In such a case, the separate red, green, and blue video signals from the camera would each have to be separately digitized and interfaced to the computer. With this arrangement, users could, for example, indicate areas to be drawn in one color with a red object while selecting functions from a menu with a blue object, or while drawing in another color in another area with a green object. Furthermore, if the interface or computer calculated the ratios of the red, green, and blue signal levels at each point of the image, more than three different object colors could be used to send distinct graphic input signals to the computer. Such an arrangement, in combination with a brush whose fibers were dyed with one color at one end which gradually blended into a different color at the other end, would allow users to signal to the computer an area where a gradient was to serve as the input pattern and the orientation of that gradient. This would allow the device to mimic the effects achieved on paper by loading a brush with a concentration gradient of pigment.

A multiplicity of black and white video cameras, with differently colored filters in front of their lenses, could all be aimed at a single drawing surface in order to achieve the same effects as noted above for a color camera. Such an arrangement would also allow for sensitivity over a greater range of wavelengths, with the appropriate choice of filters and camera phosphors. Thus, for example, objects which emitted only infrared light could be used to provide graphic input.

Being able to adjust the spatial frequency of input during the process of drawing individual strokes is particularly useful when representing quasi-regular patterns, such as are formed by the leaves on a tree, grasses, mountain chains, fur, hair, smoke, and clouds. In such cases users can learn to control a brush with rapid, repeatable hand movements which produce such patterns with a minimum of time and effort and a maximum of orderliness, expressiveness, and spontaneity. The disclosed input device allows users already familiar with the graphical effects peculiar to brushes and other continuously adjustable graphic arts tools to achieve those same effects, with the same tools, directly in interactive computer graphics. It may therefore also be used for calligraphic input, particularly in brush drawn Oriental scripts, and in electronic type design.

As discussed above, the circuitry may be used to write new input data into memory or merely scan and display the new information. An additional tool to aid the artist would include a writing implement having a switch which will allow the immediate selection of either the scanning or writing mode. By this arrangement, the artist can draw practice lines in the scan mode and then actuate the switch to write in the desired strokes. In the preferred embodiment, a pen switch can be activated through pressure in a manner found in prior art light pen or digitizing tablet constructions.

While the preferred embodiments of the computer graphic input device have been disclosed, since different implementations of the invention may be preferred by others, and since modifications will naturally occur to those skilled in this art, the scope of the invention should not be interpreted as limited to the illustrated or described embodiments.

I claim:
1. A graphical input device comprising:
   a transparent material with one surface thereof defining a drawing surface, with the index of refraction of the material being greater than the index of refraction of the medium on one side of the drawing surface;
   light absorbing means located on the other side of said drawing surface;
   camera means located on said other side of said drawing surface and in a manner to only capture light rays which originate from said light absorbing means and which have been totally internally reflected from said drawing surface whereby lighted objects placed on said drawing surface will be imaged by said cameral means only when said objects are in direct contact with said one side of said drawing surface, with the remaining field being dark due to said light absorbing means.

2. A graphical input device as recited in claim 1 further including a liquid layer covering said drawing surface, said liquid having an index of refraction greater than the surrounding medium such that said liquid layer functions to define an effective drawing surface to facilitate the imaging of objects.

3. A graphical input device as recited in claim 1 wherein said transparent material has at least three faced, with a first face defining the drawing surface, and wherein a darkened second face defines said light absorbing means and wherein said camera means is located to receive light through a third face.

4. A graphical input device as recited in claim 3 further including a means for illuminating objects to be imaged, said illumination means being directed into the transparent material through a face other than said third face.

5. A graphical input device as recited in claim 1 further including a means for correcting horizontal distortion created by said camera means.

6. A graphical input device as recited in claim 5 wherein said correcting means is defined by a means for modulating the horizontal deflection of the scanning beam of said camera means in proportion to the degree of vertical deflection.

7. A graphical input device comprising:
   a transparent material having at least four faces and a prismatic configuration, with a first face defining a drawing surface and a second face being parallel to the first, with the index of refraction of the material being greater than the index of refraction of the medium on one side of the drawing surface;
   camera means located in a manner to only capture light rays which have been totally internally reflected from said drawing surface such that an object will be imaged only when said object is in contact with said one side of the drawing surface; and
   a video monitor for displaying images captured by said camera means, said monitor being located adjacent said second surface to permit the viewing of objects imaged by said camera means and displayed by said video monitor through the drawing surface.

8. A graphical input device as recited in claim 7 further including a liquid layer covering said drawing surface, said liquid having an index of refraction greater than the surrounding medium such that said liquid layer functions to define an effective drawing surface to facilitate the imaging of objects.

9. A graphical input device as recited in claim 7 wherein said video monitor displays imaged objects in white on a dark background.

10. A graphical input device as recited in claim 7 wherein said video monitor displays imaged objects in black on a light background.

11. A graphical input device as recited in claim 7 further including a means for correcting horizontal distortion created by said camera means.

12. A graphical input device as recited in claim 11 wherein said correcting means is defined by a means for modulating the horizontal deflection of the scanning beam of said camera means in proportion to the degree of vertical deflection.

* * * * *

UNITED STATES PATENT AND TRADEMARK OFFICE
CERTIFICATE OF CORRECTION

PATENT NO. : 4,561,017
DATED : December 24, 1985
INVENTOR(S) : Richard Greene

It is certified that error appears in the above-identified patent and that said Letters Patent are hereby corrected as shown below:

The address of the Inventor should read as follows:
          700 31st Ave. #2
          San Francisco, Calif. 94121

In Claim 1, line 15 change "cameral" to --camera--.

In Claim 3, line 3 change "faced" to --faces--.

In Claim 4, lines 4 and 5 change "third face" to --second face--.

Signed and Sealed this

Thirteenth Day of May 1986

[SEAL]

Attest:

DONALD J. QUIGG

Attesting Officer

Commissioner of Patents and Trademarks